United States Patent
Franke

[11] Patent Number: 5,937,079
[45] Date of Patent: Aug. 10, 1999

[54] METHOD FOR STEREO IMAGE OBJECT DETECTION

[75] Inventor: Uwe Franke, Uhingen, Germany

[73] Assignee: Daimler-Benz AG, Stuttgart, Germany

[21] Appl. No.: 08/923,937

[22] Filed: Sep. 5, 1997

[30] Foreign Application Priority Data

Sep. 5, 1996 [DE] Germany .................. 196 36 028

[51] Int. Cl.$^6$ ................................................. G06K 9/00
[52] U.S. Cl. ................................... 382/103; 382/154
[58] Field of Search ................... 382/103, 106, 382/107, 154; 348/42, 43, 47; 356/12

[56] References Cited

U.S. PATENT DOCUMENTS

| | | | |
|---|---|---|---|
| 5,684,890 | 11/1997 | Miyashita et al. | 382/154 |
| 5,719,954 | 2/1998 | Onda | 382/154 |
| 5,818,959 | 10/1998 | Webb et al. | 382/154 |

FOREIGN PATENT DOCUMENTS

| | | |
|---|---|---|
| 0 626 655 A2 | 5/1994 | European Pat. Off. . |
| 43 08 776 A1 | 9/1993 | Germany . |
| 44 31 479 A1 | 3/1996 | Germany . |

*Primary Examiner*—Jon Chang
*Assistant Examiner*—Jingge Wu
*Attorney, Agent, or Firm*—Evenson McKeown Edwards & Lenahan, PLLC

[57] ABSTRACT

In a method for detecting and tracking objects by stereo image evaluation a part of structure class images is initially generated from a recorded stereo image pair. Differences in brightness of selected pixels in the environment are determined for each pixel as digital values, which are combined to form a digital value group, with identical groups defining their own structure classes. Structure classes which lack a brightness change along the epipolar line are discarded. Corresponding disparity values are then determined for the pixels in the other structure classes and are collected in a disparity histogram with a given frequency increment. The pixel group that belongs to a given grouping point area of the histogram is then interpreted as an object to be detected.

8 Claims, 2 Drawing Sheets

METHOD FOR STEREO IMAGE OBJECT DETECTION

BACKGROUND AND SUMMARY OF THE INVENTION

This application claims the priority of German Application No. 19636028.5, filed Sep. 5, 1996, the disclosure of which is expressly incorporated by reference herein.

The invention relates to a method for detecting and possibly tracking objects by recording and evaluating stereo images. A method of this type is useful for example as an aid for automated guidance of highway vehicles, and also in the field of robotics, where it may be necessary to detect relevant objects and determine their position and size.

In autonomous vehicle guidance, for example in urban stop-and-go traffic, in addition to fixed objects located in the travel area of the vehicle, all moving objects in the immediate vicinity must be detected. On the other hand, no complete, dense depth chart of the scene is necessary for such applications. Thus in most cases a relatively flat base surface and clearly elevated objects can be used as a point of departure. In addition, no detailed information is required to be derived, such as the exact shape of a vehicle ahead. Such simplifying boundary conditions likewise apply to a plurality of problems in the fields of robotics and monitoring technology.

Methods of stereo image object detection can be divided into area-based methods and feature-based methods. Area-based methods are described, for example, in the conference papers by K. Sanejoschi, "3-D Image Recognition System by Means of Stereoscopy Combined with Ordinary Image Processing," Intelligent Vehicles '94, Oct. 24, 1994 to Oct. 26, 1994, Paris, pages 13 to 18 and L. Matthies et al., "Obstacle Detection for Unmanned Ground Vehicles: A Progress Report," Intelligent Vehicles '95, Sep. 25–26, 1995, Detroit, pages 66 to 71. They require a higher computing capacity than feature-based methods. For an overview of current stereo image object detection methods, see O. Faugeras, "Three-Dimensional Computer Vision," MIT Press, 1993.

A method for detection of objects, especially vehicles, is known from German patent document DE 44 31 479 A1, in which two images are taken of a given area from different viewing angles. From a comparison of the two images, especially their gray values, an object is detected for at least a partial area if the difference between the two images for the partial area in question is greater than a predetermined threshold.

In a system disclosed in German patent document DE 43 08 776 A1 for monitoring a state external to the vehicle, a stereo image object detection method is used by which a given object is imaged within a fixed region outside a vehicle. The images recorded are subjected to an image processing device which calculates distance distribution over the entire image. In order to discover a given object in the left and right images, the respective image is divided into small regions and color or brightness samples are compared within these regions for the two images in order to discover regions with corresponding object details and from this to determine the distance distribution over the entire stereo image.

German patent document EP 0 626 655 A2 describes a device for detecting vehicles ahead and for determining their distance, which uses a stereo image object detection method. For image evaluation, special techniques are employed, tailored to detection of vehicle contours, which use vehicle contour models. The corresponding disparity and hence the vehicle distance are determined for a recognized vehicle.

One object of the present invention is to provide a method for stereo image object detection that is especially suitable for the above applications, with simplified boundary conditions, and is comparatively efficient and reliable.

In the method according to the invention, a structure class image pair (that is, a pair of images, with pixel data processed as discussed below) is initially generated from the recorded stereo image pair, with the differences in brightness of predetermined pixels in the environment being determined for each pixel, in digital form. The digital values are then combined in a predetermined sequence to form a digital value group, each of the various possible groups thus defining a separate structure class (that is, a different pattern of brightness variation).

Next, an advantageous and simply-designed correspondence analysis is conducted, in which all structure classes are omitted from consideration that show no structure gradients in the direction of the epipolar line; that is, along the line of corresponding pixel pairs of a common original pixel. (These are the structure classes whose pixels do not differ in brightness by a predeterminable amount from the brightness of the ambient pixels located in the direction of the epipolar line.) This results in considerable savings in image processing, since structures that extend in this direction, by virtue of the system, are not useful in any case for determining distance in feature-based stereo image evaluation.

For all the other structure classes, disparity values of corresponding pixels in the same structure class are then determined and collected in a disparity histogram to form a frequency value. Optionally, for each corresponding pixel pair, the corresponding disparity value can be included in the histogram with a weighted frequency increment. Then the histogram is studied for grouping point areas. At fixed grouping point areas of interest, the corresponding pixel group of a corresponding structure class image is then conversely represented and interpreted as an object that is located at a certain distance. It turns out that this object detection method operates very efficiently for many applications, and offers reliable results which are less prone to error.

In one embodiment of the method according to the invention, a ternary logic is used to digitize the brightness differences. This arrangement permits a structural classification that is very advantageous for the applications under consideration here, for two reasons: first it permits sufficiently differentiated structure classifications; and second it offers structure classifications that can be performed rapidly.

In another embodiment, the four pixels are selected as ambient pixels that directly adjoin the respective reference pixel on both sides, parallel to and then perpendicular to the epipolar line, respectively, or are separated therefrom by a predeterminable sampling width. A sampling width with the size of one or possibly several pixels allows the incorporation of a larger neighborhood area, which is advantageous in cases in which the brightness gradients typically extend over a range of several pixels.

In a further embodiment, the necessary calculation is further decreased by the fact that no disparities are favored. For each pixel of one structure class image, only the minimal disparity (in other words the distance from the closest pixel with the same structure class in another structure class image) is determined and taken into account to plot the disparity histogram. The basic assumption of favoring small disparities and hence larger object distances is especially suitable for use in vehicles for viewing street scenes with their relatively large obstacles. With this procedure, the appearance of close phantom objects in correspondence analysis, like those that can be generated by remote periodic structures such as building fronts, is also suppressed.

In still another embodiment, in addition to the digital value group representing the brightness differences, each pixel is assigned a contrast value that differentiates more sharply the magnitudes of the brightness differences that occur, and is used as a weighting factor to form a weighted frequency increment. For each corresponding pixel pair for which a disparity value is determined, the same is then added with the contrast-dependent weighted frequency increment to the disparity histogram. As a result, structures with high contrast are taken into account to a greater extent in image evaluation, reducing background noise.

In yet another embodiment, object detection is expanded by cluster analysis of the pixel groups interpreted as belonging to an individual object. Such grouping is sufficiently simply structured, and also permits an improved location and tracking of movement of the object.

In still a further embodiment, continuous movement tracking is performed on an object after it has been detected, with object detection according to the invention being performed cyclically and repeatedly and limited to a minimum cube that contains the detected object. The limitation to the relevant image area in each case not only saves computer expense, but also reduces the influence of disturbing background objects in particular. In addition, only a relatively small range of disparity values needs to be evaluated, with the corresponding depth of the cube being determined from the maximum anticipated change in distance.

Finally, still another embodiment is suitable for highway vehicles and includes a plausible road model that makes it possible to filter out structures on the surface of the road with a high degree of reliability. This arrangement facilitates the detection of objects in the area above the surface of the road and/or reliable detection of markings on the roadway for autonomous vehicle transverse guidance.

Other objects, advantages and novel features of the present invention will become apparent from the following detailed description of the invention when considered in conjunction with the accompanying drawings.

DETAILED DESCRIPTION OF THE DRAWINGS

Figure 1:
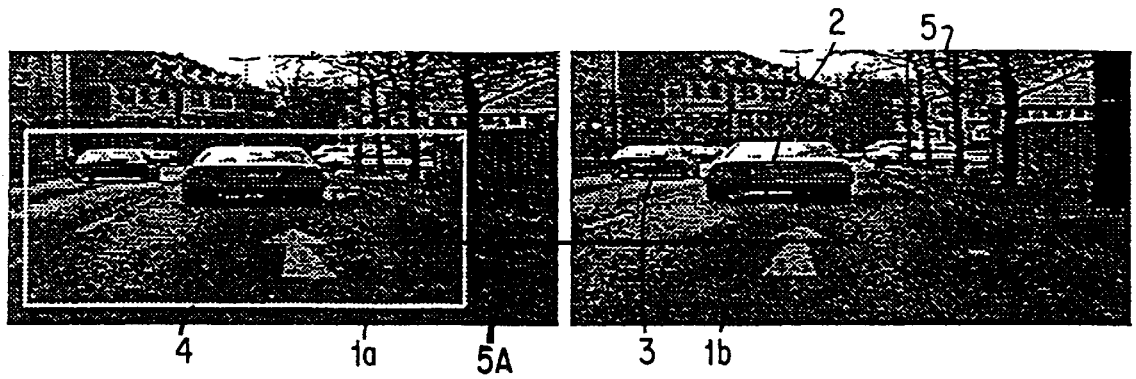
FIG. 1 is a stereo image pair recorded by a stereo camera system of a vehicle.

FIG. 1 shows a stereo image pair 1a, 1b reproducing a typical street traffic scene. For continuous recording of traffic in front of a vehicle on the basis of such stereo image pairs 1a, 1b, a forwardly directed stereo camera system is mounted in conventional fashion on the vehicle. The optical axes of the system preferably are directed parallel to one another and offset horizontally with respect to one another. In this case, the corresponding epipolar lines (the lines along which a common original pixel pair in a stereo image can be offset relative to the corresponding pixel in the other stereo image) e.g., 5A in FIG. 1 simultaneously form the respective image lines of stereo image pair 1a, 1b that makes subsequent disparity evaluation especially simple. Stereo image monitoring of traffic in front of the vehicle can be used in particular for automatic guidance of the vehicle in the lengthwise and/or transverse direction and/or for warning of obstacles that appear, such as other vehicles and pedestrians. Objects of interest in stereo image pair 1a, 1b in FIG. 1 consequently are, in particular, vehicle 2 traveling ahead in the same lane as well as vehicle 3 located in an adjacent lane. The goal of the object detection method described in greater detail below is in particular to determine quickly, reliably and automatically the position of these two objects 2, 3 relative to the vehicle itself.

Figure 2:
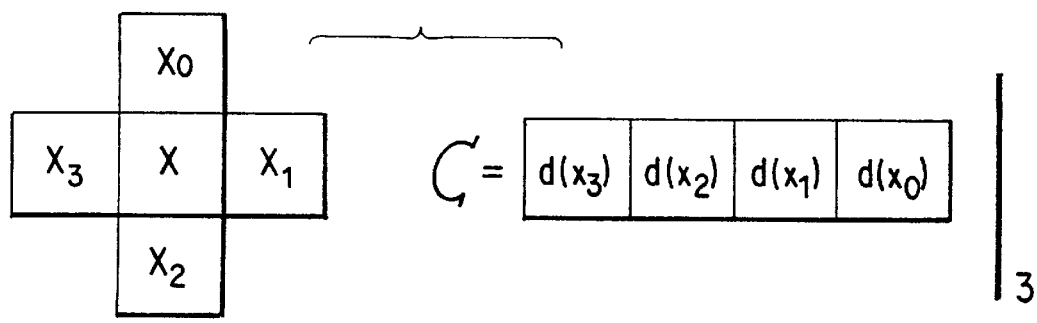
FIG. 2 is a schematic diagram of the structural classification used for evaluation of stereo images according to FIG. 1.

For this purpose, each of the two stereo images 1a, 1b is transformed into a corresponding structure class image by means of a structure classification, as indicated schematically in FIG. 2. For each pixel x in the two stereo images 1a, 1b, an ambient pixel volume (brightness) is defined, which in the case of FIG. 2 consists of the four ambient pixels $x_0$, $x_1$, $x_2$, and $x_3$ that are immediately adjacent in the line and column direction (in other words parallel to and perpendicular to the horizontal epipolar line). If this choice of ambient pixels proves to be too local, a larger adjacent area of ambient pixels or a set of ambient pixels that are farther away may be selected instead. When a larger neighborhood area is chosen, implying a cubic increase in the number of structure classes and allowing the sensitivity to increase relative to the brightness threshold selected, evaluation in a Gaussian pyramid is advantageous. Satisfactory results are achieved by an increase in the sampling width that is less expensive from the computer standpoint; in other words instead of the immediately adjacent ambient pixels selected in FIG. 2 in lines and columns, those pixels are chosen which at reference pixel X have a distance of one or a few pixels.

In each case, the brightness of reference pixel x is compared pairwise with the brightness of each of the respective ambient pixels $x_0$ to $X_3$. In particular, using a positive brightness threshold value T, a brightness difference digital value $d(x_i)$ is generated as a comparison result in the form of a ternary number, according to a ternary logic, based on the following relationship:

$$d(x_i) = \begin{cases} 1, & \text{when } g(x_i) - g(x) < T \\ 2, & \text{when } g(x_i) - g(x) < -T \\ 0, & \text{otherwise} \end{cases}$$

where $g(x)$ is the brightness of the reference pixel, and $g(x_i)$ (with i=0 . . . 3) is the brightness of the respective ambient pixel. The four ternary numbers $d(x_0)$ to $d(x_3)$ determined in this fashion for a pixel x are then conjoined to form a group in the form of a ternary number C with the form:

$$C = \sum_{i=o}^{3} 3^i \cdot d(x_i)$$

as shown on the right side of FIG. 2. For the ternary number C thus formed, eighty-one different values are possible, each of which defines a separate structure class. Instead of ternary digitization of the brightness differences described above, other multiple value digitizations can of course also be considered. However, digitization that is only binary suppresses gradient information that is an important component of subsequent correspondence analysis, while higher value digitizations result in increased computing cost.

Figure 3:
FIG. 3 is a gray-value representation of the structure class image obtained by structure classification according to FIG. 2 from the left-hand stereo image in FIG. 1.

FIG. 3 shows the result of the structure classification for left-hand stereo image 1a in FIG. 1, with the interval [0, 255] and a brightness difference threshold value of T=20 being chosen as the total brightness scope. For a better illustration, the ternary numbers C obtained were multiplied by a factor of three and inverted so that the pixels in FIG. 3 that belong to the structure class with ternary number C=0 appear white.

It is evident from FIG. 3 that because of the nonlinearity produced by brightness threshold value T, considerable data reduction is achieved. In the image shown in FIG. 3, approximately 50% of all pixels belong to the structure class with C=0. Another 25% of the pixels belong to the so-called horizontal structure classes, in other words those with horizontal structures in which $d(x_3)=d(x_1)=0$. Such horizontal structure classes are not useful for evaluation of stereo images, with the epipolar line chosen to be horizontal in the present case, and are therefore not taken into account in subsequent image evaluation. Accordingly, only 25% of the pixels need be subjected to correspondence analysis.

By choosing a suitable evaluation window, this number of pixels can be decreased further, with an increase in evaluation reliability. Thus for example in the present case the image range that is significantly beyond the horizon, and hence the road surface, can be filtered out as not of interest. A favorable evaluation window is indicated for example in left-hand stereo image 1a of FIG. 1 by white frame 4. By choosing this evaluation window 4, in the present image scene the quantity of pixels that must be taken into account for subsequent correspondence analysis is reduced to 13% of all the pixels, and at the same time disturbing factors are avoided by disparity error determinations that relate to image areas that have been filtered out.

The production of the structure class image pair is followed by a simplified correspondence analysis, which is not a clear solution to the correspondence problem as far as pixels are concerned, but supplies sufficiently reliable results for the applications under consideration here, at a correspondingly lower computer cost. In such applications the relevant objects to be detected have structures with brightness gradients that are essentially perpendicular to the epipolar line, which is true not only of vehicles but also of most standing objects and especially of pedestrians. The procedure is then as described in the following in detail.

With each pixel in a structure class image as a reference point, within a predetermined disparity interval a search is made for pixels of the same structure class in the other structure class image located along the corresponding epipolar line (e.g., 5A in FIG. 1) as the critical search direction. Because of the parallel optical axes of the image recording camera and the horizontally offset arrangement of the latter, in the present example the search direction runs in the image line direction. For a pixel that is found, its distance from the position of the reference pixel is determined and added as a corresponding disparity value to a disparity histogram, namely unweighted in a first alternative. In other words the frequency in the histogram for each disparity value per occurrence is the same, increased by one.

In a second alternative, a frequency increment is used that is weighted and takes image contrast into account. For this purpose, for each pixel x, a local contrast value is generated from the brightness differences determined, for example a contrast value K(x) with the form:

$$K(\chi) = \frac{1}{N} \sum_i |g(\chi_i) - g(\chi)|,$$

where N is the number of ambient pixels whose brightness differs by more than the brightness threshold value T from the reference point brightness, and in the summation, only these ambient pixels are taken into account once again. In this way, the individual pixel acquires a contrast weight that makes it possible to emphasize contrast-rich structures in disparity analysis. One way of taking this contrast value into account in plotting the disparity histogram consists in entering into the histogram generation process the disparity value determined for an individual corresponding pixel pair, not with a frequency increment of one but with a frequency increment increased by the minimum of the contrast values that belong to the two correlating pixels. This produces a sharper separation between the frequency point ranges, in other words the peak ranges, in the resultant disparity histogram from background noise.

Figure 4:
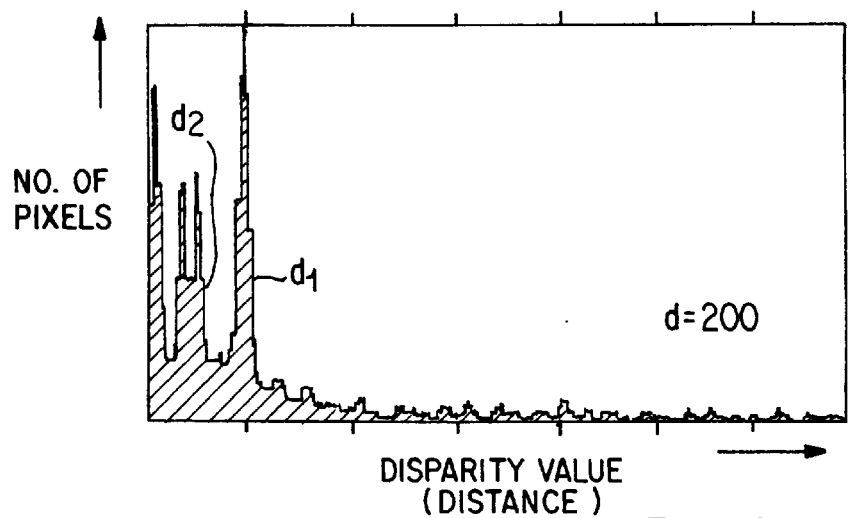
FIG. 4 is a disparity histogram with a plurality of grouping points that is obtained for the structure class images that belong to the stereo images in FIG. 1.

FIG. 4 shows the disparity histogram obtained by the above-explained disparity analysis process using an unweighted frequency increment of one from the area of evaluation window 4, with disparity values between zero and 200. At each reference pixel in a structural image, all pixels in the other structural image that lie in the direction of the corresponding epipolar line are taken into account. Alternatively, for the present application (namely observing traffic), favoring small disparity values has proven to be advantageous, which correlates with a preference for greater distances. In complex street scenes, frequently periodic structures such as house front 5 in stereo image pair 1a, 1b in FIG. 1 cause considerable noise in the disparity histogram, while because of their periodicity they simulate phantom objects standing very close to the camera location. This is effectively overcome by favoring greater distances. This takes place in a simple and effective manner by virtue of the fact that during disparity analysis, for each reference pixel in a structure class image, only the pixel in the same structure class that is closest to the latter on the epipolar line is taken into account in the other structure class image. This procedure has proven to be reliable for observing traffic in those street scenes that occur under practical conditions, with their relatively large obstacles, and results in a very advantageous saving of computer time and the suppression of phantom objects. As an alternative to the two-dimensional histogram shown in FIG. 4, if necessary, a three-dimensional disparity histogram can be prepared as a quantitized depth chart, in which, as an additional histogram axis, the lateral offset of the respective reference pixel can be brought up to the central axis of the image.

Figure 5:
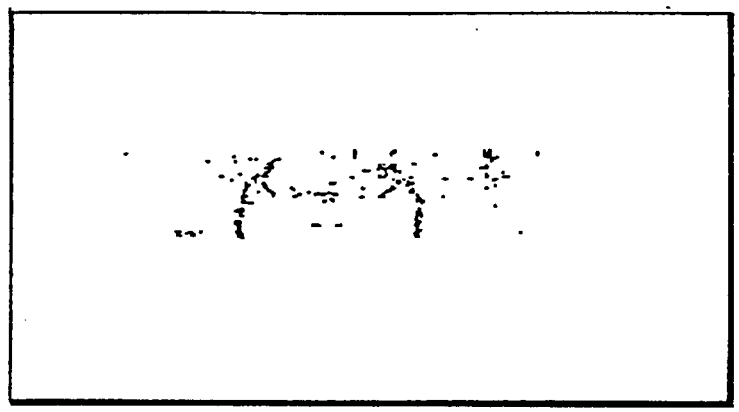
FIG. 5 is a view of an pixel group linked with a first grouping point in FIG. 4.
Figure 6:
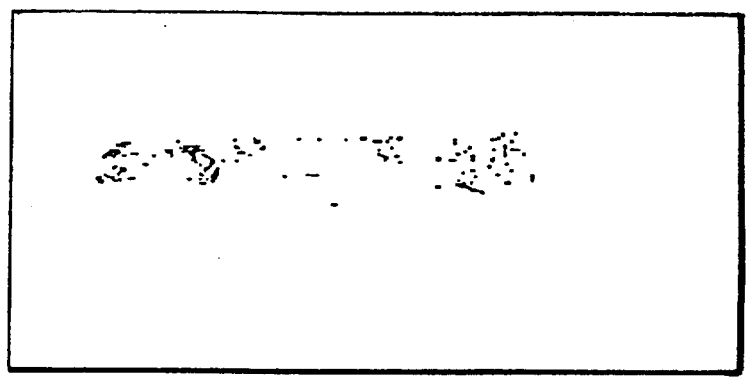
FIG. 6 is a view of an pixel group linked with a second grouping point in FIG. 4.

After the disparity histogram has been prepared in one form or another, it is investigated for grouping point areas. In FIG. 4, from the pronounced frequency point ranges, the two with the highest disparity values d1, d2 are labeled, with one ($d_1$) corresponding to a disparity peak value of about 28 and the other ($d_2$) corresponding to a disparity peak value of about 15. Each such frequency point range should correspond to an object in the observation area. To verify this, and thus complete object detection, in the reverse direction from disparity analysis, the same pixels in a structure class image are then reproduced that belong to an individual disparity grouping point range. Thus in FIG. 5 the pixels that belong to disparity grouping point range $d_1$ with disparity peak value 28, and in FIG. 6 the pixels that belong to disparity grouping point range $d_2$ with a disparity peak value of 15, are shown. As indicated, FIG. 5 already reproduces very well the vehicle 2 ahead in the same lane, while vehicle 3 in the other lane dominates the image in FIG. 6. From this it can be concluded that these two vehicles 2, 3 belong to these two disparity grouping point ranges $d_1$ and $d_2$.

From this assignment of a final disparity value to a given object, the distance L of the latter from the stereo camera system can be determined by the relationship $L=f_x \cdot B/d$, where B is the base distance of the stereo camera system, $f_x$ is their scaled focal length, and d is the respective disparity value. Then the detected object can be further observed continuously (that is, tracked) if necessary. For this purpose, initially a simple cluster analysis is performed in which a rectangular window of minimum height and width is positioned in the resultant object image similarly to FIGS. 5 and 6 so that a predetermined minimum percentage of 90% for example of the pixels found is contained therein. Since the above trigonometric relationship represents a relatively coarse approximation for object distance L because of the quantization of the disparity values, particularly those with small disparities, and in this case is not yet optimal for determining motion processes, it may also be advantageous to perform an improved disparity estimate that corresponds to a sub-pixel accurate measurement in which the peak value of an individual disparity grouping point range has added to it a correction term with the form $$d_d = 0.5(h_+ + h_-)/(2h_m - (h_+ + h_-))$$

where $h_m$ is the peak value and $h_+$ and $h_-$ are the levels of disparity in the individual side areas.

Following object detection performed in this manner (with the determination of distance and the approximate extent of the individual object), in the next tracking phase an image evaluation is performed which is limited to the relevant image area that contains the object to be observed, using the method described above in a cyclically repeated fashion. The method according to the invention permits typical method cycles on the order of only 100 ms to 200 ms as compared with typical cycle times of several seconds in more cumbersome stereo image evaluation methods. As a result of image area limitation, not only is computer time saved but also, in particular, the influence of disturbing background objects is reduced. Of primary importance is the fact that only a relatively small disparity range has to be evaluated in which a cube is imagined to have been placed around the object to be tracked. The depth of said cube depends upon the maximum change in distance to be expected.

The lateral position of an object of interest can be determined for tracking in a lane by means of the beam set for example from the lateral position of the image midpoint (or alternatively the most important point) in the image. Advantageously, the results obtained are subjected to conventional Kalman filtration in order to obtain optimum results by taking into account knowledge about limited movement possibilities.

In order to isolate road surface structures from the structures of objects above the road surface, a simple road model can be used in which a plane road surface and parallel optical axes of the stereo camera system are assumed. For the anticipated disparity $d_E(x, y)$ of a pixel with coordinates (x, y) in the image plane, from camera height H above the road and the camera tilt angle α relative to the horizon, the following relationship is obtained:

$$d_E(x,y) = (B/H)f_x((y/f_y)\cos\alpha + \sin\alpha),$$

where $f_x$ and $f_y$ are the scaled focal lengths in the coordinate directions in question and B is the base width of the stereo camera system. For extraction of the road surface structures, under these conditions only points below the horizon contribute. All pixels with disparity values that lie within a certain interval around the anticipated value lie on the road surface, while those with larger disparity values belong to objects above the road surface and those with disparity values that are too small are caused by reflections of more distant objects.

Depending on the application, symmetry considerations can also be used for object detection which reduce computer cost and can increase reliability of detection. In any event, the method according to the invention permits very rapid and reliable object detection with given detection reliability and can be used for optical real-time object observation in road traffic, in the field of robotics, and wherever there is a need for stereo-image-based detection and possibly tracking of objects.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method for stereo image object detection, comprising the following steps:

first, recording at least one stereo image pair for an area of interest;

second, generating a structure class image pair from a respective recorded stereo image pair, by the steps of for each pixel in each recorded image of said recorded stereo image pair, determining digital values representative of differences between a brightness value for such pixel and brightness values for a plurality of predetermined ambient pixels; and conjoining the resultant determined digital values in a predetermined sequence to form a digital value group, with identical digital value groups defining an independent structure class;

third, performing a correspondence analysis of the structure class image pair in which for each particular pixel in one structure class image of said structure class image pair, only those structure classes in the other structure class image of said structure class image pair are taken into account which have at least one ambient pixel that lies along an epipolar line corresponding to said particular pixel and has a brightness which differs by one or more brightness digital steps;

for each pixel of a structure class of one structure class image to be taken into account, pixels that lie within a predetermined disparity interval on the epipolar line and have the same structure class are searched, and a corresponding disparity value is determined; and disparity values thus obtained corresponding to an assigned frequency increment are combined in a disparity histogram; and fourth, identifying frequency point areas in the resultant disparity histogram and extracting an individual object from the pixel group that belongs to a particular grouping point range.

2. Method according to claim 1, wherein for digital value determination in said second step, a ternary system is used, wherein brightness differences which are smaller than or equal to a predetermined positive brightness threshold value are assigned a first ternary number, brightness differences that are greater than the threshold value are assigned a second ternary number, and the brightness differences that are smaller than the negative of the threshold value being assigned a third of the three ternary number.

3. Method according to claim 1, wherein for each pixel, two pixels are used as ambient pixels, which are located on opposite sides of the respective reference pixel, firstly parallel to and then perpendicular to the epipolar line, said pixels being located immediately adjacent to the reference pixel or separated from the latter by a predeterminable sampling width.

4. Method according to claim 1, wherein the predetermined disparity interval for the correspondence analysis is chosen so that for a given pixel in a structure class image, only the closest pixel on the epipolar line in another structure class image is taken into account, and the disparity value for such closest pixel is added to the disparity histogram.

5. Method according to claim 1, wherein for each pixel of the structure class image pair, in addition to the respective digital value group, a contrast value determined from the brightness differences is assigned as a weight factor, and the disparity value determined for a given pixel pair with a frequency increment weighted by the corresponding contrast values is added to the disparity histogram.

6. Method according to claim 1, wherein the extraction of an object from a pixel group that belongs to a given disparity grouping point area comprises a cluster analysis of the pixel group with which a rectangle of minimum area is determined that contains a predeterminable percentage of the pixels of this pixel group.

7. Method according to claim 1, wherein following initial extraction of an object from the pixel group that belongs to a given disparity grouping point range, movement of said object is tracked by repeated performance of said second, third and fourth steps limited to a range of a minimum cube that contains the object in question.

8. Method according to claim 1, for detection of objects in traffic, wherein assuming an essentially plane street pattern and parallel optical stereo camera axes, those pixels whose associated disparity values lie within a predetermined expectation range are located around a disparity expectation value $d_E$ that satisfies the following condition:

$$d_E(x,y) = (B,H)f_x( (Y/f_y)\cos\alpha + \sin\alpha),$$

where B is the base width of the stereo camera system, H is the height of the latter above the road surface, and $\alpha$ is its tilt angle relative to the road surface, $f_x$ and $f_y$ are the lateral and vertical camera focal lengths and y is the image vertical coordinate pointing downward from the optical axis, interpreted as belonging to an object on the road surface.

* * * * *